United States Patent [19]

Aratake et al.

[11] Patent Number: 5,116,899
[45] Date of Patent: May 26, 1992

[54] RESIN COMPOSITION FOR ELECTRIC INSULATION MATERIALS FOR VEHICLES

[75] Inventors: Kazuhiko Aratake; Masayoshi Horikoshi, both of Ichihara; Fumio Kato, Kariya; Yasuhiko Suzuki, Toyoake; Yuki Morimoto, Okazaki, all of Japan

[73] Assignees: Chisso Corporation; Nippondenso Co., Ltd., both of Japan

[21] Appl. No.: 742,281

[22] Filed: Aug. 8, 1991

Related U.S. Application Data

[63] Continuation of Ser. No. 332,605, Apr. 3, 1989, abandoned, which is a continuation-in-part of Ser. No. 131,629, Dec. 10, 1987, abandoned.

[30] Foreign Application Priority Data

Dec. 15, 1986 [JP] Japan .................................. 61-298019

[51] Int. Cl.⁵ .......................... C08K 13/04; C08K 3/34; C08L 23/26; C08L 79/08
[52] U.S. Cl. ..................................... 524/371; 524/449; 524/451; 524/504; 524/404; 524/405; 524/411; 524/522
[58] Field of Search ............... 524/449, 451, 371, 504, 524/404, 405, 411, 449, 451, 522

[56] References Cited

U.S. PATENT DOCUMENTS

| 4,663,369 | 5/1987 | Kawai et al. | 523/214 |
| 4,699,935 | 10/1987 | Sano | 523/449 |
| 4,707,505 | 11/1987 | Matsuno et al. | 523/217 |
| 4,983,647 | 1/1991 | Ueno et al. | 523/220 |
| 4,987,173 | 1/1991 | Nomura et al. | 524/525 |
| 5,030,682 | 7/1991 | Nomura et al. | 524/522 |

FOREIGN PATENT DOCUMENTS

| 9074140 | 4/1984 | Japan | 524/371 |
| 1252256 | 11/1986 | Japan | 524/451 |
| 2143831 | 2/1985 | United Kingdom | 524/451 |

Primary Examiner—Melvyn I. Marquis
Assistant Examiner—Christopher P. Rogers
Attorney, Agent, or Firm—Leydig, Voit & Mayer

[57] ABSTRACT

The present invention is directed to a resin composition for electric insulation materials for vehicles such as distributor caps which is prepared by blending a crystalline propylene-ethylene copolymer resin with 3 to 10 wt. % of a glass fiber, 10 to 20 wt. % of talc or mica, 5 to 20 wt. % of silica, 4 to 20 wt. % of modified polyolefin resins, 10 to 30 wt. % of halogen-containing flame retardants and 3 to 15 wt. % of flame retardant auxiliaries. In the resin composition of the present invention, balance is kept in all points of mechanical characteristics, mechanical characteristics at high temperature, electrical characteristics, nitric acid resistance, weld characteristics, blooming resistance, corona resistance and flame retardance.

20 Claims, No Drawings

RESIN COMPOSITION FOR ELECTRIC INSULATION MATERIALS FOR VEHICLES

This application is a continuation of application Ser. No. 07/332,605, filed Apr. 3, 1989, now abandoned, which is a continuation in-part application of U.S. Pat. No. 07/131,629, filed on Dec. 10, 1987, and now abandoned.

CROSS-REFERENCE TO RELATED APPLICATION

The present invention claims a priority on the basis of Japanese Patent Application No. 298,019/1986.

BACKGROUND OF THE INVENTION (1) Field of the Invention

The present invention relates to a resin composition applied to electric insulation materials for vehicles. More specifically, it relates to a resin composition for distributor caps which is prepared by blending a crystalline propylene-ethylene copolymer resin with glass fibers, talc or mica, silica, modified polyolefin resins, halogen-containing flame retardants and flame retardant auxiliaries.

(2) Description of the Prior Art

Heretofore, as materials for distributor caps have been used, for example, an epoxy resin, a polybutylene terephthalate resin containing glass fibers ( hereafter referred to as the glass fiber-containing PBT), a polypropylene resin containing talc and a polypropylene resin containing talc and flame retardants.

The electric insulation materials for vehicles in this invention mean the electric insulation materials for motor vehicles, used at high temperature, under often wet contaminated circumstances, like in an engine room or compartment, and at high voltage. Such material is typically used for distributor caps.

The epoxy resins have a long history and have been used extensively in many fields, but their product cost is high because of a high material cost and manufacturing cost, and they are poor in impact resistance and, therefore, are liable to break during transportation disadvantageously. The glass fiber-containing PBT and the talc-containing polypropylene resin can solve the above problems. However, glass fiber-containing PBT has a poor tracking resistance, and, therefore, when distributor caps comprising the glass fiber-containing PBT are used in a briny air environment, the outer surfaces of the distributor caps are partially carbonized, so that the problem of bad insulation occurs. As for the talc-containing polypropylene resin, mechanical characteristics (stiffness) at high temperatures weld characteristics and the ability to withstand voltage duration (hereinafter referred to corona resistance) are poor. Furthermore, a common problem of glass fiber-containing PBT and talc-containing polypropylene is that flame retardance is poor.

The reason why the tracking resistance is necessary is as follows: When the distributor caps are under circumstances where their surfaces are liable to be brought into contact with a saline solution or the like, as in a briny air environment,the surfaces are contaminated with moisture and further partially carbonized by a minute electric discharge so as to allow an electrical conduction therethrough, so that their insulation properties become bad.

The tracking resistance as surface characteristics is due to the molecular structure of the resin material. A resin such as the PBT which has a benzene ring in the molecule is bad in tracking resistance. This reason is as follows: Carbon bonds in the benzene ring are firm, and therefore the resin is hard to gasify by a heat energy of the minute discharge, so that conductive free carbon having a graphite structure, is apt to be left on the surfaces. To the contrary, polypropylene resin has no benzene ring in the molecule, and therefore its tracking resistance is extremely good. Accordingly, from the viewpoint of the tracking resistance, the polypropylene resin is most desirable as a material for distrbutor caps.

The reason why the above-mentioned mechanical characteristics (stiffness) at high temperature is necessary is as follows: In recent years, conditions in the vicinity of an automotive engine have been severe and, with regard to the distributor cap under such conditions, a higher heat resistance is required. However, the talc-containing polypropylene resin has poor mechanical characteristics (stiffness) at high temperature ( e.g., such temperature as to cause a thermal distortion under a fiber stress of 18.6 kg/cm2 : usually 90° to 100° C.). Therefore, when a tower portion of cap onto which a load from a high-tension cord is applied is vibrated at a high temperature, this portion tends to be deformed and damaged.

The above-mentioned problems of the weld characteristics include a problem of bad weld appearance which looks as if cracks have occurred in the molded distributor caps, and another serious problem that cracks occur in electrode portions of the caps and a weld portion on the periphery of insert fitments. That is, such cracks in the weld portion are caused by a progressive crystallization subsequent to molding, by post shrinkage and by heat stress generated from a cooling-/heating cycle when the caps are exposed to high-temperature conditions in an engine room of an automobile for a long period of time, or when exposed to rapid temperature change conditions in winter.

The corona resistance can be defined as follows: When the surfaces of distributor caps are contaminated with a salline solution or the like as in a briny air district, and when they are exposed to corona discharge for a long period of time, insulating properties of the distributor caps deteriorate in a vertical direction thereof, and finally dielectric breakdown occurs in the distributor caps. Therefore, the corona resistance can be defined as properties which withstand voltage duration of the above-mentioned corona discharge in the vertical direction.

Further, the reason why the above-mentioned flame retardance is necessary is as follows: When a connector for distribution is fixed improperly, an arc discharge is generated during driving an automobile and the tower portion of a distributor cap is carbonized by a discharge energy of this arc discharge. When the carbonization progresses, the cap must be replaced with a new one.

Polypropylene resin containing talc and a flame retardant can eliminate the drawback of poor flame retardance which glass fiber-containing PBT and talc-containing polypropylene resins have. With regard to the polypropylene resin containing talc and flame retardant, however, as a result of the incorporation of the flame retardant, the mechanical characteristics (tensile strength) decline, and in addition, the poor weld characteristics which are the drawback of the talc-containing polypropylene resin are worsened. Furthermore, when this resin is used under high-temperature conditions, the used flame retardant blooms to impair its appearance and flame retardance decline disadvantageously.

In view of the above-mentioned conventional technical problems, the object of the present invention is to provide a resin composition suitable for electric insulation materials for vehicles in which balance is kept in all points of cost, workability, impact strength, mechanical characteristics (tensile strength), mechanical characteristics (stiffness) at high temperature, tracking resistance, weld characteristics, corona resistance and flame retardance.

SUMMARY OF THE INVENTION

The present invention is directed to a resin composition usable for electric insulation materials for vehicles such as distributor caps which is prepared by blending a crystalline propylene-ethylene copolymer resin with glass fibers, talc or mica, silica, modified polyolefin resins, halogen-containing flame retardants and flame retardant auxiliaries in a suitable ratio. Balance is kept in the resin composition in all points of mechanical characteristics, mechanical characteristics at high temperature, electrical characteristics, nitric acid resistance, weld characteristics, blooming resistance and flame retardance.

DESCRIPTION OF THE SPECIFIC EMBODIMENT

With regard to the five problems of cost, workability, impact strength, mechanical characteristics (tensile strength) and tracking resistance, they have already been solved by a conventional talc-containing polypropylene resin.

The corona resistance can be obtained by using a polymer having excellent heat resistance such as epoxy resin, polyimide resin or polyester resin in accordance with a known technique, but the employment of such a polymer leads to the increase in production cost due to high material cost and low productivity, as discussed above. Therefore, it is not practical to use such a kind of polymer. As a technique of improving mechanical strength (tensile strength and stiffness) of polypropylene resin, it is known to add an inorganic filler such as a glass fiber or talc to the resin. However, this known technique inconveniently deteriorates properties which withstand voltage duration over a long period, though it does not have any influence on the properties at an early stage. In the insulating material of the polypropylene, the corona resistance can be evaluated by applying half (about 17.5 to 20 kv/mm) of the dielectric breakdown voltage (about 35 to 40 kv/mm) to a 1-mm-thick test piece in a vertical direction so as to generate corona discharge on the surface of the insulation material, and then measuring the period of time for which the insulating material withstands the voltage. glass fiber is used, the endurance time is rapidly shortened with an increase in the amount of the glass fiber. When the life of a test piece containing no glass fiber is designated as 1, the life of the test piece containing 10% by weight of glass fibers is 1/5, that of a test piece containing 20% by weight of the same is ¼, and that of a test piece containing 30% by weight of the same is about 1/20.

Furthermore, when talc is used, the results are as follows: When the life of a test piece containing no talc is designated as 1, the life of the test piece containing 10% by weight of the talc is shortened about 40%, that of a test piece containing 20% by weight of the same is shortened 45%, and that of a test piece containing 40% by weight of the same is shortened to ½ or less. Incidently, talc is now used practically in an amount of 40% by weight.

Research has been conducted to determine the cause of lowering the corona resistance, and finally it has been found that when the insulating material containing, for example, glass fiber is placed in an electric field in which conditions for the generation of the corona discharge are satisfied, the corona discharge occurs among the pieces of the glass fiber or in minute defective portions present between the pieces of the glass fiber and boundary surfaces of the resin, with the result that the life of the insulating material is shortened. This tendency is similarly seen in the case of insulating material containing talc which is in the state of platy crystals.

In particular, the life of insulating material depends upon the morphology, kind and blend ratio of the inorganic filler which is a reinforcing material.

With regard to insulating materials containing polypropylene resin reinforced with the glass fiber and talc to heighten mechanical strength and stiffness at a high temperature, the problem of the corona resistance is still unsolved. Incidently, the above-mentioned insulating materials are currently being used. It is crucial to the development of distributors that corona resistance be heightened, maintaining mechanical characteristics and stiffness at high temperature at a level necessary for the distributors.

For the purpose of solving the problem, various inorganic fillers which were different in morphology were separately added to polypropylene resin, and corona resistance was evaluated in the same manner as described above. As a result, it was found that when the amount of amorphous silica or barium sulfate is 20% by weight or less, the life ratio of 1 can be maintained, and when the amount thereof is 30% by weight, the life of insulating material deteriorated to 85%. In particular, when silica was used in an amount of 10 to 20% by weight, the life ratio can be maintained at a level of 1, whereby the effectiveness of silica to the corona resistance was found.

Flame retardance can be obtained by adding flame retardants in accordance with a known technique, but when the flame retardants are added directly to the talc-containing polypropylene resin, its mechanical characteristics (tensile strength) are reduced, and weld characteristics which have been originally poor and further worsened inconveniently. Therefore, other points of the development are to add the flame retardant without sacrificing any mechanical characteristics (tensile strength) and to improve the mechanical characteristics (stiffness) at high temperature and the weld characteristics to a higher level than in the talc-containing polypropylene resin. That is, types and optimum composition ratios of inorganic fillers as reinforcing materials and the flame retardant are crucial to the success in the present invention.

Further, it is attributable to the morphology of a talc grain crystal that the talc-containing polypropylene resin is poor in mechanical characteristics (stiffness) at high temperature and weld characteristics. That is, the talc is a lamellar crystal like mica and thus is oriented in the form of a layer in the weld portion of a molded article, so that a tensile strength of this weld portion is as poor as 20 to 40% of the portion other than the weld portion. This is the cause of the poor weld characteristics. Moreover, the aspect ratio of the talc is not so high which has a great influence on the strength and stiffness of the molded article comprising an inorganic filler composite resin composition, and this is the cause of the reduced mechanical characteristics (stiffness) at high temperature. In consequence, for the purpose of improving the machanical characteristics (stiffness) at high temperature and the weld characteristics, the morphology of the inorganic fillers which are blended with the polypropylene resin also is an important factor.

When it is investigated what inorganic fillers should be blended, besides the above-mentioned mechanical characteristics (stiffness) at high temperature, corona resistance and weld characteristics nitric acid resistance and arc resistance must be additionally taken into consideration when the resin is used for distribution caps. The reason why nitric acid resistance is necessary is as follows: A nitrogen compound (NOx), which is generated during the use of the distributor, reacts with water in air present in the distributor to produce nitric acid. Inorganic matter, if any, in the distributor cap material reacts with the thus produced nitric acid in order to form nitrates (e.g., calcium nitrate and magnesium nitrate), and these nitrates are deposited on the surface of the distributor cap. Since the nitrates are deliquescent, the distributor cap loses electrical insulation properties. This is the reason why the nitric acid resistance is necessary.

The reason why arc resistance is necessary is as follows: The distributor cap, in use, is sometimes exposed to an arc discharge which is generated between electrodes, so that an intensive discharge energy is thereby generated causing high temperature, which attacks the outer surface of the cap locally. As a result, gasification and carbonization progress, and eventually a carbon track (a conductive path of carbon) is formed by the carbonization which leads to bad insulation. This is the reason why arc resistance is necessary. Such a requirement is closely connected with the above-mentioned resistance to the tracking phenomenon and arc resistance which tends to occur on the cap surface in the wet contamination state. Accordingly, polypropylene resin which is liable to gasify by the discharge energy is basically excellent in arc resistance, but nevertheless even with the same kind of resin, this arc resistance and corona resistance vary with the kinds and amounts of fillers used. For example, if a fibrous filler such as a glass fiber is added in large quantities, the arc resistance as well as corona resistance will deteriorate.

In the first place, the inventors of the present application have investigated and evaluated various fillers in accordance with the monophology from the five viewpoints of mechanical characteristics (stiffness) at high temperature, weld characteristics, nitric acid resistance, corona resistance and arc resistance. The evaluation is carried out by employing talc as a standard (Table 1).

As understood from Table 1, no filler alone satisfied all of the five characteristics, and it was made clear that only one kind of filler could hardly achieve the above object. Then, the present inventors chose fillers having different characteristics (mechanical characteristics at high temperature, weld characteristics and arc resistance) from the fillers which meet nitric acid resistance, and multi-component systems each comprising two or more kinds of fillers were investigated. As a result, it has been found that a blend of talc or mica as a lamellar filler, a glass fiber as fibrous filler and silica as an amorphous filler has the most balanced characteristics With regard to the provision of flame retardance, it is a known technique to add a flame retardant to a polypropylene resin composition. However, when a resin composition which has been prepared merely by adding a kind of halogen-containing flame retardant to the polypropylene resin composition is used to form an article, and when the latter article is used under high-temperature conditions for a certain period of time, the flame retardant used bleeds on the surface of the article, so that the appearance of the article is worsened and simultaneously the flame retardance is lowered disadvantageously. Therefore, in order to solve this problem of poor blooming resistance, a polypropylene resin having a high compatibility with the flame retardant is chosen, and there is employed the notion that a flame retardant having heat resistance and nitric acid resistance is effective. As a result of various research, the following fact has been found: When there were used a crystalline propylene-ethylene copolymer resin, a halogen-containing flame retardant having a melting point of 200° C. or more [e.g., decabromodiphenyl ether, dodecachlorododecahydrodimethanodibenzocyclooctene (trade name Dechloranplus)] and an antimony compound (e.g., antimony trioxide) or a boron compound (e.g., zinc borate or borax) as an auxiliary flame retardant, the drawback of bad appearance due to bleeding and the decline in flame retardance can be mitigated remarkably.

On the basis of the above-mentioned fundamental investigation results, detailed research has been further conducted intensively, and as a result, it has been found that a composition having the under mentioned constitution can achieve the object of the present invention.

The present invention constitutes a resin composition for electric insulation material for vehicles, such as distributor caps, which is prepared by blending a crystalline propylene-ethylene copolymer resin with 3 to 10 wt. % of glass fibers, 10 to 20 wt. % of talc or mica, 5 to 20 wt. % of silica, 4 to 20 wt. % of modified polyolefin resins, 10 to 30 wt. % of halogen-containing flame retardants and 3 to 15 wt. % of auxiliary flame retardants, the percentages being based on the resin composition.

The resin composition in present invention is the most appropriately used for distributor caps which are liable to be exposed to high temperature and moisture contaminated circumstances and are loaded high voltage and are brought into contact with spark, among the electric insulation materials for vehicles.

The crystalline propylene-ethylene copolymer resin used in the present invention is composed of 2 to 35 wt. % of ethylene and has a melt flow rate (MFR; a discharge of a melted resin for 10 minutes when 2.16 kg is loaded at temperature of 230° C.) of 1.0 to 80 g/10 minutes, and in particular, a crystalline propylene-ethylene block copolymer resin is preferable.

With regard to the glass fibers used in the present invention, the diameter and length are not particularly limited, and the commercially available glass fibers for thermoplastic resins may usually be used. An amount of the glass fibers to be blended is within the range of 3 to 10 wt. %, preferably 5 to 8 wt. %. When the content of the glass fiber is less than 3 wt. %, the electric insulation material Such as a distributor cap obtained by molding its resin composition has poor mechanical characteristics (stiffness) at high temperature. However, when the concentration of the glass is more than 10 wt. %, the electric insulation materials, used for objects such as distribution caps, obtained by molding its resin composition has excellent mechanical characteristics (stiffness) at high temperature but simultaneously has poor arc characteristics and corona resistance.

With regard to talc or mica used in the present invention, its grain diameter is not particularly limited and a commercial talc or mica, desirably having a great aspect ratio, ordinarily used for thermoplastic resins can be used. The talc or mica may be employed without any treatment, but for the purpose of improving adhesive properties with a matrix resin or dispersion properties, grains of this material may be coated, prior to its use, with various organic titanate coupling agents, silane coupling agents, fatty acids, metallic salts of fatty acids or fatty esters. An amount of the talc or mica to be blended is within the range of 10 to 20 wt. %, based on the weight of the resin composition. When the content of the talc or mica is less than 10 wt. %, the electric insulation materials, used for objects such as distributor caps, obtained by molding its resin composition has insufficient mechanical characteristics (stiffness) and poor corona resistance at high temperature, and when it is in excess of 20 wt. %, articles obtained by molding its resin composition have poor weld characteristics.

With regard to the silica used in the present invention, its grain diameter is not particularly limited, and the commercial silica for thermoplastic resins may be usually used. The silica may be employed without any treatment, but for the purpose of improving adhesive properties with a matrix resin or dispersion properties, grains of the silica may be coated, prior to its use, with various organic titanate coupling agents, silane coupling agents, fatty acids, metallic salts of fatty acids or fatty esters, in common with the above-mentioned talc or mica. An amount of the silica to be blended is within the range of 5 to 20 wt. %, preferably 5 to 15 wt. %, based on the weight of the resin composition. When the content of the silica is less than 5 wt. %, articles obtained by molding its resin composition have poor corona resistance. Further, when it is in excess of 20 wt. %, a granulation in the manufacturing process of composition pellets cannot be carried out smoothly.

The modified polyolefin resin used in the present invention can be obtained by melting and kneading a polyolefin resin such as a polyethylene, a propylene homopolymer, a propylene-ethylene copolymer or a polybutene together with an unsaturated carboxylic acid or its anhydride (e.g., maleic anhydride) in the presence of an organic peroxide. Concrete examples of the usable modified polyolefin resins include modified polyethylenes, modified propylene homopolymers, modified propylene-ethylene copolymers and modified polybutenes, the modified propyleneethylene copolymers being particularly preferred. An amount of the modified polyolefin resin to be blended is within the range of 4 to 20 wt. %, preferably 6 to 12 wt. %, based on the weight of the resin composition.

The halogen-containing flame retardants used in the present invention have a melting point of 200° C. or more, and concrete examples of the usable halogen-containing flame retardants include decabromodiphenyl ether, dodecachlorododecahydrodimethanodibenzocyclooctene (trade name Dechloranplus) and mixtures thereof. An amount of the halogen-containing flame retardants to be blended is within the range of 10 to 30 wt. %, preferably 10 to 20 wt. %, based on the weight of the resin composition. When the content of the halogen-containing flame retardants is less than 10 wt. %, articles obtained by molding its resin composition do not have as high a flame retardance as would be expected. However, when the concentration is more than 30 wt. %, articles obtained by molding its resin composition are poor in mechanical characteristics (tensile strength), and a granulation in the manufacturing process of composition pellets cannot be carried out smoothly.

Concrete examples of the auxiliary flame retardant used in the present invention include an antimony compound such as antimony trioxide and boron compounds such as zinc borate and borax. An amount of the auxiliary flame retardant to be blended is preferably in a weight ratio of ¼ to ½ based on the weight of the halogen-containing flame retardant.

In addition to the above-mentioned blending materials, the following materials may be blended with the resin composition for electric insulation materials for vehicles according to the present invention: Colorants such as a dyes or pigments, nucleating agents, lubricants, antioxidants, heat stabilizers, light stabilizers, release agents, crosslinking agents, radical generators, foaming agents and the like.

A manufacturing process of the resin composition for distributor caps according to the present invention is not particularly limited, and the following process is one example: In a stirring mixer such as a Henschel mixer (trade name) or a supermixer are placed the above-mentioned crystalline propylene-ethylene copolymer resin and specific amounts of talc or mica, silica, modified polyolefin resins, halogen-containing flame retardants and auxiliary flame retardants, and stirring is then carried out for a period of 30 seconds to 3 minutes. To the resulting mixture, glass fibers are added, and in a stirring mixer such as a tumble mixer, the mixture is then rotated 5 to 20 times for the sake of stirring/mixing. The resulting mixture is melted, kneaded and pelletized by the use of a Banbury mixer, rolls and an extruder. A temperature for melting and kneading is within the range of 180° C. to 280° C., preferably 200° C. to 250° C.

EXAMPLES

Now, the present invention will be described in detail in reference to examples, but it should not be limited by these examples.

Various tests in the examples and comparative examples were each performed by the following procedure:

(1) Mechanical Characteristics

Mechanical characteristics were evaluated by measuring a tensile strength (in accordance with JIS K-7113).

(2) Mechanical Characteristics at High Temperature (stiffness)

Mechanical characteristics at high temperature (stiffness) were evaluated by measuring a heat distortion temperature (fiber stress of 18.6 kg/cm2) (in accordance with JIS K-7207).

(3) Electrical Characteristics

Electrical characteristics were evaluated by measuring arc resistance (in accordance with ASTM D-495).

(4) Nitric Acid Resistance

Each specimen having a size of 50×50×2 mm which was prepared by injection molding was immersed into a commercial nitric acid (concentration 61% specific gravity 1.38), and the generation of gas bubbles was observed. The nitric acid resistance was evaluated by estimating the specimen forming no gas bubbles to be good and the specimen resulting in bubble generation to be bad.

(5) Weld Characteristics

A weld strength was evaluated by measuring a weld tensile strength (in accordance with JIS K-7113), and weld characteristics were evaluated by visually observing a weld portion of a JIS No.1 type weld tensile dumbbell-shaped specimen which is prepared by injection molding (in which a weld was formed in the middle of JIS No.1 type tensile dumbbell-shaped specimen, L=178mm ). In this case, the specimen on which the weld portion was noticeably perceptible was estimated to be bad, and the specimen on which the weld portion was scarcely perceptible was estimated to be good.

(6) Blooming Resistance

Each specimen having a size of 50×50×2 mm prepared by injection molding was allowed to stand at 100° C. for 240 hours in an oven, and afterward its appearance was observed visually. In this case the specimen showing bloom was estimated to be bad, and the specimen showing no bloom was estimated to be good.

(7) Flame Retardance

Each specimen having a size of 127×12.7×1.6 mm which was prepared by injection molding was subjected to a burning test in accordance with a vertical burning test process of American UL Standard Subject 94 (UL 94), whereby a flame retardant was evaluated.

(8) Corona Resistance

For the evaluation of the corona resistance, disc-shaped test pieces having a diameter of 100 mm and a thickness of 1.0 mm were used which had been molded by injection molding. A brass electrode having a diameter of 20 mm and a spherical tip radius of 10 mm was disposed above the test piece, and another disc-shaped brass electrode having a diameter of 25 mm and a thickness of 5 mm, in which the whole periphery was trimmed with portions of radius 2.5 mm, was disposed under the test piece. An an alternating current voltage of 17.5 KV at commercial frequency was applied across these electrodes in an atmosphere at 120° C. The evaluation of the corona resistance was represented by a ratio of the life until the breakdown of each test piece with respect to the life of polypropylene resin containing no filler.

Examples 1 to 17 and Comparative Examples 1 to 18

In Examples 1 to 17, in a Henschel mixer (trade name) were placed a propylene-ethylene block copolymer resin having a melt flow rate of 10 g/10 minutes and containing 8.5 wt. % of ethylene and talc, or mica, silica, a modified propylene-ethylene copolymer resin, decabromodiphenyl ether and antimony trioxide in predetermined amounts, as set forth in Tables 2 and 3, and stirring/mixing was then carried out for 1 minute. A predetermined amount of glass fibers was afterward added to the resulting mixture, and the mixture was rotated 10 times in a tumbler for the sake of stirring/mixing. The resulting mixture was melted, kneaded and pelletized at a melting/kneading temperature of 230° C. by the use of a twin-screw extruder having a bore diameter of 30 mm.

In Comparative Examples 1 to 18, as set forth in Tables 4 and 5 given below, predetermined amounts of components to be blended were stirred and mixed in a Henschel mixer (trade name) and a tumbler, and the resulting mixture was then melted, kneaded and pelletized by the use of a twin-screw extruder having a bore diameter of 30 mm.

Specimens having a predetermined shape were molded at a resin temperature of 250° C. and at a mold temperature of 50° C. from the thus prepared pellets by injection molding in the respective examples and comparative examples, and the evaluation of these specimen was made with regard to mechanical characteristics, mechanical characteristics at high temperature, electrical characteristics, nitric acid resistance, weld characteristics, blooming resistance and flame retardance. The results of the evaluation are summarized in Table 2 to 5.

As indicated in Tables 2 and 5, the molded articles of the resin compositions according to the present invention in Examples 1 to 17 were sufficiently balanced in points of mechanical characteristics (tensile strength), and stiffness) (which were represented by the heat distortion temperature) at high temperature, electrical characteristics (arc resistance, corona resistance), nitric acid resistance, weld characteristics, blooming resistance and flame retardance. In particular, as be apparent from the comparison between Examples 1 to 17 and Comparative Examples 1 to 8 in which the amounts of talc or mica were in excess of 20 wt. %, poor weld characteristics which were the drawback of the talc-containing polypropylene could be solved by adding silica and glass fibers.

Further, as is apparent from the comparison between Examples 1 to 17 and comparative Examples 2,3,4,7,10,16 and 18 in which the basic polymer was a crystalline propylene homopolymer resin, the blooming phenomenon (a powdery coating phenomenon on the surface of the molded article under high temperature conditions ) which is the drawback of halogen-containing flame retardants (decabromodiphenyl ether) used herein could be solved by using the propylene-ethylene block copolymer resin. In Comparative Examples 1,2,3.4.5,9,10 and 11 in which amounts of the glass fibers were less than 3 wt. %, the mechanical characteristics (stiffness) at high temperature were poor.

In Comparative Examples 1 to 5 in which talc and mica were used separately, Comparative Examples 6 to 8 in which talc and mica were used together and Comparative Examples 12 to 14 in which the amount of the glass fiber was in excess of 10% by weight, the corona resistance was poor. In Comparative Examples 1,3,6,9,12 and 15 in which amounts of the halogen-containing flame retardants were less than 10 wt. %, flame retardance was poor. In Comparative Examples 15, 16, 17 and 18 in which calcium carbonate was used, corona resistance was good but nitric acid resistance was bad.

To sum up, when the resin composition of the present invention is used, distributor caps can be obtained which are excellent in mechanical characteristics, mechanical characteristics at high temperature, electrical characteristics, nitric acid resistance, weld characteristics blooming resistance and flame retardance.

TABLE 1

Evaluation of Each Inorganic Filler to Characteristics

| Morphology | Filler | Mechanical Charac. (stiffness) at High Temp. | Weld Charac. | Nitric Acid Resistance | Arc Resistance | Corona Resistance |
|---|---|---|---|---|---|---|
| Lamellar | Talc | Δ | X | ○ | ○ | Δ |
|  | Mica | ○ | X | ○ | ○ | Δ |
| Fibrous | Calcium Silicate | Δ | Δ | X | Δ | Δ |
|  | Glass Fiber | ○ | ○ | ○ | X | X |
| Amorphous | Calcium Carbonate | X | ○ | X | ○ | ○ |
|  | Barium Sulfate | X | ○ | ○ | ○ | ○ |
|  | Silica | Δ | ○ | ○ | ○ | ○ |
|  | Glass Beads | X | ○ | ○ | X | X |
|  | Magnesium Hydroxide | X | ○ | X | ○ | ○ |
|  | Aluminum Hydroxide | X | ○ | X | ○ | ○ |

○: Good, Δ: Middle, X: Bad

TABLE 2

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Blending Materials (wt. %) | | | | | | | | | | | | |
| PP Block Copolymer | 54 | 49 | 44 | 54 | 44 | 47 | 56.5 | 51.5 | 51.5 | 51.5 | 46.5 | 41.5 |
| Glass Fiber | 5 | 5 | 5 | 5 | 5 | 5 | 7.5 | 7.5 | 7.5 | 7.5 | 7.5 | 7.5 |
| Talc | 10 | 15 | 10 | 10 | 10 | 10 | 10 | 5 | 10 | 10 | 10 | 15 |
| Mica | 0 | 0 | 10 | 0 | 10 | 0 | 0 | 10 | 0 | 0 | 10 | 0 |
| Silica | 10 | 10 | 10 | 5 | 5 | 5 | 5 | 5 | 5 | 10 | 5 | 10 |
| Modified PP | 6 | 6 | 6 | 6 | 6 | 6 | 6 | 6 | 6 | 6 | 6 | 6 |
| DBDE | 10 | 10 | 10 | 15 | 15 | 20 | 10 | 10 | 15 | 10 | 10 | 15 |
| Antimony Trioxide | 5 | 5 | 5 | 5 | 5 | 7 | 5 | 5 | 5 | 5 | 5 | 5 |
| Tensile Strength (kg/cm$^2$) | 360 | 340 | 330 | 380 | 320 | 330 | 420 | 410 | 400 | 400 | 400 | 400 |
| Heat Distortion Temp. (18.6 kg/cm$^2$; °C.) | 115 | 115 | 120 | 105 | 120 | 125 | 120 | 125 | 125 | 120 | 125 | 125 |
| Arc Resistance (sec) | 100 | 100 | 100 | 90 | 90 | 80 | 100 | 100 | 90 | 100 | 100 | 90 |
| Nitric Acid Resistance | Good | Good | Good | Good | Good | Good | Good | Good | Good | Good | Good | Good |
| Weld Characteristics | | | | | | | | | | | | |
| Tensile Strength (kg/cm$^2$) | 180 | 170 | 145 | 190 | 140 | 165 | 200 | 190 | 190 | 200 | 160 | 200 |
| Appearance | Good | Good | Good | Good | Good | Good | Good | Good | Good | Good | Good | Good |
| Blooming Resistance (100° C.; 240 hrs) | Good | Good | Good | Good | Good | Good | Good | Good | Good | Good | Good | Good |
| Flame Retardance (UL94; Vertical Burning Test; 1.6t; Class) | V-2 | V-2 | V-2 | V-1 | V-0 | V-0 | V-2 | V-2 | V-1 | V-2 | V-2 | V-1 |
| Corona Resistance | 0.8 | 0.7 | 0.7 | 0.7 | 0.7 | 0.6 | 0.6 | 0.6 | 0.6 | 0.6 | 0.6 | 0.6 |

PP Block Copolymer: Propylene-ethylene block copolymer resin having a melt flow rate of 10 g/10 minutes and containing 8.5 wt. % of ethylene.
Modified PP: Maleic anhydride-modified propylene-ethylene copolymer resin.
DBDE: Decabromodiphenyl ether.

TABLE 3

|  | Ex. 13 | Ex. 14 | Ex. 15 | Ex. 16 | Ex. 17 |
|---|---|---|---|---|---|
| Blending Materials (wt. %) | | | | | |
| PP Block Copolymer | 39.5 | 36.5 | 36.5 | 54 | 49 |
| Glass Fiber | 7.5 | 7.5 | 7.5 | 10 | 10 |
| Talc | 10 | 20 | 10 | 10 | 10 |
| Mica | 0 | 0 | 10 | 0 | 0 |
| Silica | 10 | 10 | 10 | 5 | 5 |
| Modified PP | 6 | 6 | 6 | 6 | 6 |
| DBDE | 20 | 15 | 5 | 10 | 15 |
| Antimony Trioxide | 7 | 5 | 5 | 5 | 5 |
| Tensile Strength (kg/cm$^2$) | 350 | 400 | 400 | 450 | 450 |
| Heat Distortion Temp. (18.6 kg/cm$^2$; °C.) | 122 | 125 | 125 | 130 | 130 |
| Arc Resistance (sec) | 80 | 90 | 90 | 100 | 90 |
| Nitric Acid Resistance | Good | Good | Good | Good | Good |
| Weld Characteristics | | | | | |
| Tensile Strength (kg/cm$^2$) | 170 | 160 | 150 | 200 | 210 |
| Appearance | Good | Good | Good | Good | Good |
| Blooming Resistance (100° C.; 240 hrs) | Good | Good | Good | Good | Good |
| Flame Retardance (UL94; Vertical Burning Test; 1.6t; Class) | V-0 | V-1 | V-1 | V-2 | V-1 |

TABLE 3-continued

|  | Ex. 13 | Ex. 14 | Ex. 15 | Ex. 16 | Ex. 17 |
|---|---|---|---|---|---|
| Corona Resistance | 0.6 | 0.6 | 0.6 | 0.5 | 0.5 |

PP Block Copolymer: Propylene-ethylene block copolymer resin having a melt flow rate of 10 g/10 minutes and containing 8.5 wt. % of ethylene.
Modified PP: Maleic anhydride-modified propylene-ethylene copolymer resin.
DBDE: Decabromodiphenyl ether.

TABLE 4

|  | Comparative Example | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Blending Materials (wt. %) | | | | | | | | | | | | |
| PP Homopolymer | 60 | 45 | 60 | 55 | 0 | 59 | 44 | 0 | 60 | 45 | 0 | 49 |
| PP Block Copolymer | 0 | 0 | 0 | 0 | 55 | 0 | 0 | 44 | 0 | 0 | 45 | 0 |
| Glass Fiber | 0 | 0 | 0 | 0 | 0 | 5 | 5 | 5 | 0 | 0 | 0 | 15 |
| Talc/Mica | 40/0 | 40/0 | 30/0 | 10/20 | 30/0 | 10/20 | 10/20 | 10/20 | 15/0 | 15/0 | 15/0 | 10/10 |
| Silica | 0 | 0 | 0 | 0 | 0 | 0 | 0 | 0 | 25 | 25 | 25 | 10 |
| Modified PP | 0 | 0 | 0 | 0 | 0 | 6 | 6 | 6 | 0 | 0 | 0 | 6 |
| DBDE | 0 | 10 | 7 | 10 | 10 | 0 | 10 | 10 | 0 | 10 | 10 | 0 |
| Antimony Trioxide | 0 | 5 | 3 | 5 | 5 | 0 | 5 | 5 | 0 | 5 | 5 | 0 |
| Tensile Strength (kg/cm$^2$) | 350 | 320 | 330 | 320 | 300 | 450 | 430 | 400 | 300 | 300 | 280 | 600 |
| Heat Distortion Temp. (18.6 kg/cm$^2$; °C.) | 95 | 100 | 100 | 105 | 95 | 130 | 130 | 120 | 90 | 100 | 90 | 140 |
| Arc Resistance (sec) | 135 | 135 | 135 | 135 | 135 | 135 | 135 | 135 | 135 | 135 | 135 | 80 |
| Nitric Acid Resistance | Good | Good | Good | Good | Good | Good | Good | Good | Good | Good | Good | Good |
| Weld Characteristics | | | | | | | | | | | | |
| Tensile Strength (kg/cm$^2$) | 120 | 110 | 145 | 100 | 135 | 130 | 130 | 120 | 180 | 180 | 170 | 150 |
| Appearance | Bad | Bad | Bad | Bad | Bad | Bad | Bad | Bad | Good | Good | Good | Good |
| Blooming Resistance (100° C.; 240 hrs) | Good | Bad | Bad | Bad | Good | Good | Bad | Good | Good | Bad | Good | Good |
| Flame Retardance (UL94; Vertical Burning Test; 1.6t; Class) | * | V-2 | * | V-2 | V-2 | * | V-2 | V-2 | * | V-2 | V-2 | * |
| Corona Resistance | 0.4 | 0.4 | 0.4 | 0.4 | 0.4 | 0.4 | 0.4 | 0.4 | 0.5 | 0.5 | 0.5 | 0.4 |

PP Block Copolymer: Propylene-ethylene block copolymer resin having a melt flow rate of 10 g/10 minutes and containing 8.5 wt. % of ethylene.
Modified PP: Maleic anhydride-modified propylene-ethylene copolymer resin.
DBDE: Decabromodiphenyl ether.
*It did not fall under any class.

TABLE 5

|  | Comparative Example | | | | | |
|---|---|---|---|---|---|---|
|  | 13 | 14 | 15 | 16 | 17 | 18 |
| Blending Materials (wt. %) | | | | | | |
| PP Homopolymer | 0 | 0 | 59 | 44 | 0 | 39 |
| Glass Fiber/Modified PP | 15/6 | 15/6 | 5/6 | 5/6 | 5/6 | 5/6 |
| Talc/Mica | 10/10 | 10/10 | 10/0 | 10/10 | 10/0 | 10/10 |
| Silica | 10 | 5 | 0 | 0 | 0 | 0 |
| Calcium Carbonate | 0 | 0 | 20 | 20 | 20 | 20 |
| DBDE | 10 | 15 | 0 | 10 | 10 | 15 |
| Antimony Trioxide | 5 | 5 | 0 | 5 | 5 | 5 |
| Tensile Strength (kg/cm$^2$) | 550 | 500 | 400 | 370 | 330 | 320 |
| Heat Distortion Temp. (18.6 kg/cm$^2$; °C.) | 140 | 140 | 105 | 110 | 100 | 110 |
| Arc Resistance (sec) | 70 | 70 | 135 | 135 | 135 | 135 |
| Nitric Acid Resistance | Good | Good | Bad | Bad | Bad | Bad |
| Weld Characteristics | | | | | | |
| Tensile Strength (kg/cm$^2$) | 138 | 150 | 180 | 165 | 150 | 145 |
| Appearance | Good | Good | Good | Good | Good | Good |
| Blooming Resistance (100° C.; 240 hrs) | Good | Good | Good | Bad | Good | Bad |
| Flame Retardance (UL94; Vertical Burning Test; 1.6t; Class) | V-2 | V-1 | * | * | * | V-2 |
| Corona Resistance | 0.4 | 0.3 | 0.6 | 0.6 | 0.6 | 0.6 |

PP Homopolymer: propylene homopolymer resin having a melt flow rate of 10 g/10 minutes.
PP Block Copolymer: Propylene-ethylene block copolymer resin having a melt flow rate of 10 g/minutes and containing 8.5 wt. % of ethylene.
Modified PP: Maleic anhydride-modified propylene-ethylene copolymer resin.
DBDE: Decabromodiphenyl ether.
*It did not fall under any class.

What is claimed is:

1. A resin composition for electric insulation materials for components of vehicles consisting essentially of a blend of an unmodified crystalline propylene-ethylene copolymer resin with 3 to 10 wt. % of glass fibers, 10 to 20 wt. % of talc or mica, 5 to 20 wt. % of silica, 4 to 20 wt. % of a modified polyolefin resin, 10 to 30 wt. % of a halogen-containing flame retardant and 3 to 15 wt. % of an auxiliary flame retardant, said percentages being based on the weight of said resin composition.

2. A resin composition for electric insulation materials for vehicles according to claim 1 wherein said crystalline propylene-ethylene copolymer resin contains 2 to 35 wt. % of ethylene and has a melt flow rate of 1.0 to 80 g/10 minutes.

3. A resin composition for electric insulation materials for vehicles according to claim 1 wherein an amount Of said glass fibers is within the range of 5 to 8 wt. %.

4. A resin composition for electric insulation materials for vehicles according to claim 1 wherein an amount of said silica is within the range of 5 to 15 wt. %.

5. A resin composition for electric insulation materials for vehicles according to claim 1 wherein said modified polyolefin resin is that which is obtained by melting and kneading at least one polyolefin resin selected from polyethylene, polypropylene, a propylene-ethylene copolymer or polybutene with an unsaturated carboxylic acid or its anhydride in the presence of an organic peroxide.

6. A resin composition for electric insulation materials for vehicles according to claim 1 wherein said halogen-containing flame retardant has a melting point of 200° C. or more.

7. A resin composition for electric insulation materials for vehicles according to claim 1 wherein said halogen-containing flame retardant is decabromodiphenyl ether, dodecachlorododecahydrodimethanodibenzocyclooctene or mixtures thereof.

8. A resin composition for electric insulation materials for vehicles according to claim 1 wherein the amount of said halogen-containing flame retardant is within the range of 10 to 20 wt. %.

9. A resin composition for electric insulation materials for vehicles according to claim 1 wherein said auxiliary flame retardant is at least one of antimony compounds or boron compounds.

10. A resin composition for electric insulation materials for vehicles according to claim 1 wherein said resin composition contains at least one of colorants, nucleating agents, lubricants, anti-oxidants, heat stabilizers, light stabilizers, release agents, crosslinking auxiliaries, radical generators and foaming agents.

11. A resin composition for distributor caps which consists essentially of a blend of an unmodified crystalline propylene-ethylene copolymer resin with 3 to 10 wt. % of glass fibers, 10 to 20 wt. % of talc or mica, 5 to 20 wt. % of silica, 4 to 20 wt. % of a modified polyolefin resin, 10 to 30 wt. % of a halogen-containing flame retardant and 3 to 15 wt. % of an auxiliary flame retardant, said percentages being based on the weight of said resin composition.

12. A resin composition for distributor caps according to claim 11 wherein said crystalline propyleneethylene copolymer resin contains 2 to 35 wt. % of ethylene and has a melt flow rate of 1.0 to 80 g/10 minutes.

13. A resin composition for distributor caps according to claim 11 wherein an amount of said glass fiber is within the range of 5 to 8 wt. %.

14. A resin composition for distributor caps according to claim 11 wherein an amount of said silica is within the range of 5 to 15 wt. %.

15. A resin composition for distributor caps according to claim 11 wherein said modified polyolefin resin is that which is obtained by melting and kneading at least one polyolefin resin selected from polyethylene, polypropylene, a propylene-ethylene copolymer or polybutene with an unsaturated carboxylic acid or its anhydride in the presence of an organic peroxide.

16. A resin composition for distributor caps according to claim 11 wherein said halogen-containing flame retardant has a melting point of 200° C. or more.

17. A resin composition for distributor caps according to claim 11 wherein said halogen-containing flame retardant is decabromodiphenyl ether, dodecachlorododecahydrodimethanodibenzocyclooctene on mixtures thereof.

18. A resin composition for distributor caps according to claim 11 wherein an amount of said halogen-containing flame retardant is within the range of 10 to 20 wt. %.

19. A resin composition for distributor caps according to claim 11 wherein said flame retardant auxiliary comprises at least one of antimony compounds or boron compounds.

20. A resin composition for distributor caps according to claim 11 wherein said composition contains at least one colorants, nucleating agents, lubricants, antioxidants, heat-stabilizers, light stabilizers, release agents, crosslinking auxiliaries, radical generators and foaming agents.

* * * * *